United States Patent [19]

Wilson

[11] Patent Number: 4,525,153
[45] Date of Patent: * Jun. 25, 1985

[54] BELT TENSIONER AND METHOD OF MAKING THE SAME

[75] Inventor: Leslie B. Wilson, Reeds Spring, Mo.

[73] Assignee: Dayco Corporation, Dayton, Ohio

[*] Notice: The portion of the term of this patent subsequent to Oct. 25, 2000 has been disclaimed.

[21] Appl. No.: 516,009

[22] Filed: Jul. 21, 1983

Related U.S. Application Data

[63] Continuation of Ser. No. 296,695, Aug. 27, 1981, Pat. No. 4,411,638.

[51] Int. Cl.³ .......................... F16H 7/12; F16F 9/48
[52] U.S. Cl. .................................... 474/138; 474/136; 188/285
[58] Field of Search ................. 74/138, 137, 131, 132, 74/133, 134, 135, 136, 110, 109, 111, 103, 104; 188/285, 302; 464/180; 267/162

[56] References Cited

U.S. PATENT DOCUMENTS

| | | | |
|---|---|---|---|
| 2,703,019 | 3/1955 | Buroway | 474/110 |
| 3,142,193 | 7/1964 | Polko et al. | 474/110 |
| 3,409,335 | 11/1968 | Piepho et al. | 474/138 |
| 3,413,866 | 12/1968 | Ford | 474/138 |
| 3,602,054 | 8/1971 | Jackson et al. | 474/109 |
| 3,802,286 | 4/1974 | Winklhofer et al. | 474/110 |
| 3,817,114 | 6/1974 | Klee | 474/134 |
| 4,108,013 | 8/1978 | Sragal | 474/135 |
| 4,145,934 | 3/1979 | Sragal | 474/135 |
| 4,151,756 | 5/1979 | Binder et al. | 474/138 |
| 4,249,925 | 2/1981 | Watson | 474/110 |
| 4,276,038 | 6/1981 | Kraft | 474/110 |
| 4,411,638 | 10/1983 | Wilson | 474/138 |

FOREIGN PATENT DOCUMENTS

| | | | |
|---|---|---|---|
| 1173301 | 7/1964 | Fed. Rep. of Germany | 251/54 |
| 1293897 | 4/1969 | Fed. Rep. of Germany | 251/54 |
| 455662 | 3/1950 | Italy | 474/136 |
| 279415 | 11/1951 | Switzerland | 474/135 |
| 615549 | 1/1949 | United Kingdom | 188/88.51 |

*Primary Examiner*—Lawrence J. Staab
*Assistant Examiner*—Michael David Bednarek
*Attorney, Agent, or Firm*—Joseph V. Tassone

[57] ABSTRACT

A tensioner for a power transmission belt that is adapted to be operated in an endless path and a method of making the same are provided, the tensioner comprising a support unit for being fixed relative to the belt, a belt engaging unit carried by the support unit and being movable relative thereto, a mechanical spring unit operatively associated with the support unit and the belt engaging unit for urging the belt engaging unit relative to the support unit and against the belt with a force to tension the belt, and a fluid dampening unit operatively associated with the support unit and the belt engaging unit to dampen the movement of the belt engaging unit relative to the support unit in at least one direction of movement thereof with a restricting force of the dampening unit. The dampening unit comprises a closed fluid loop arrangement that dampens the movement of the belt engaging unit with a greater restricting force when the belt engaging unit is being moved in one direction relative to the support unit than the restricting force of the dampening unit when the belt engaging unit is being moved in the opposite direction relative to the support unit.

16 Claims, 5 Drawing Figures

4,525,153

BELT TENSIONER AND METHOD OF MAKING THE SAME

CROSS REFERENCE TO RELATED APPLICATION

This application is a continuation patent application of its co-pending parent patent application, Ser. No. 296,695, filed Aug. 27, 1981, now U.S. Pat. No. 4,411,637.

BACKGROUND OF THE INVENTION

1. Field of the Invention

This invention relates to a tensioner for an endless power transmission belt or the like as well as to a method of making such a tensioner.

2. Prior Art Statement

It is known in the art to provide a tensioner for a power transmission belt that is adapted to be operated in an endless path, the tensioner comprising a support means for being fixed relative to the belt, a belt engaging means carried by the support means and being movable relative thereto, and mechanical spring means operatively associated with the support means and the belt engaging means for urging the belt engaging means relative to the support means and against the belt with a force to tension the belt.

Examples of tensioners of the above mentioned type are provided in the following five United States patents:

(1) U.S. Pat. No. 3,413,866—Ford
(2) U.S. Pat. No. 4,108,013—Sragal
(3) U.S. Pat. No. 4,145,934—Sragal
(4) U.S. Pat. No. 4,151,756—Binder et al
(5) U.S. Pat. No. 4,249,425—Watson It appears from item (1) above that a tension spring urges an idler pulley in tensioning engagement against a belt.

It appears from item (2) above that a compression spring urges an idler pulley in tensioning engagement against a belt.

It appears from item (3) above that a leaf spring urges an idler pulley in tensioning engagement against a belt.

It appears from item (4) above that a plurality of bi-metal dish-shaped springs disposed in various stacked relations thereof urge an idler pulley in tensioning engagement against a belt.

It appears from item (5) above that pneumatic means is adapted to threadedly adjust an idler pulley rod of a belt tension wherein a pair of dish-shaped springs urge the idler pulley in tensioning engagement against a belt.

It is also known in the art to provide a piston and cylinder arrangement for hydraulically urging an idler pulley in tensioning engagement against a belt.

For example, see the following two United States patents:

(6) U.S. Pat. No. 3,142,193—Polko
(7) U.S. Pat. No. 4,276,038—Kraft

It is also known to provide a belt tensioner where friction surface dampening means of the solid type are utilized to tend to dampen vibrations and the like that are imposed on the belt tensioner.

It is also known to provide a belt tightener with a fluid dampening means, such as a conventional automobile shock absorber.

For example, see the following United States patent:
(8) U.S. Pat. No. 3,602,054—Jackson et al.

It appears that the belt tightener of item (8) above does not have mechanical spring means and tightens the belt by applying rigidly interconnecting idler pulleys respectively against the slack and tension sides of the belt, the pulleys pivoting together relative to the belt with the shock absorber dampening the pivoted movement of the pulleys.

However, it is believed that the following U.S. Patent provides a tensioner for a power transmission belt that is adapted to be operated in an endless path, the tensioner comprising a support means for being fixed relative to the belt, a belt engaging means carried by the support means and being movable relative thereto, mechanical spring means operatively associated with the support means and the belt engaging means for urging the belt engaging means relative to the support means and against the belt with a force to tension the belt, the mechanical spring means providing the sole force of the tensioner for tensioning the belt, and dampening means to dampen the movement of the belt engaging means relative to the support means with a restricting force of the dampening means, the dampening means comprising fluid dampening means operatively associated with the support means and the belt engaging means to dampen the movement of the belt engaging means relative to the support means in at least one direction of movement thereof.

For example, see the following United States Patent:
(9) U.S. Pat. No. 3,802,286—Winklhofer et al.

It appears that the belt tensioner of item (9) above has a piston of a piston and cylinder means of the tensioner urged in a tensioning direction by a compression spring disposed within the cylinder and bearing against the piston member, the piston member being cup-shaped and the cylinder member being cup-shaped with the piston member telescoped therein and with the cavity therebetween being filled with hydraulic fluid for movement dampening purposes.

SUMMARY OF THE INVENTION

It is one feature of this invention to provide an improved tensioner for a power transmission belt or the like.

In particular, it was found according to the teachings of this invention that prior known belt tensioners utilized friction surfaces to tend to dampen vibrations and the like that are imposed on the belt tensioner by the belt engaged thereby whereby such friction surfaces tend to wear out at a relatively fast rate when excessive vibrations are encountered.

However, it was found according to the teachings of this invention that it is possible to dampen movement of the spring urged belt engaging means of a belt tensioner with fluid dampening means in order to prolong the useful life of such tensioner.

For example, one embodiment of this invention provides a tensioner for a power transmission belt that is adapted to be operated in an endless path, the tensioner comprising a support means for being fixed relative to the belt, a belt engaging means carried by the support means and being movable relative thereto, mechanical spring means operatively associated with the support means and the belt engaging means for urging the belt engaging means relative to the support means and against the belt with a force to tension the belt, and dampening means to dampen the movement of the belt engaging means relative to the support means, the dampening means comprising fluid dampening means with a restricting force of the dampening means operatively associated with the support means and the belt engaging means to dampen the movement of the belt engaging means relative to the support means in at least one direction of movement thereof.

The dampening means comprises a closed fluid loop arrangement that has means that dampens the movement of the belt engaging means with a greater restricting force when the belt engaging means is being moved in one direction relative to the support means than the restricting force of the dampening means when the belt engaging means is being moved in the opposite direction relative to the support means.

Accordingly, it is an object of this invention to provide an improved tensioner for a power transmission belt or the like, the tensioner of this invention having one or more of the novel features of this invention as set forth above or hereinafter shown or described.

Another object of this invention is to provide an improved method of making a tensioner for a power transmission belt or the like, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
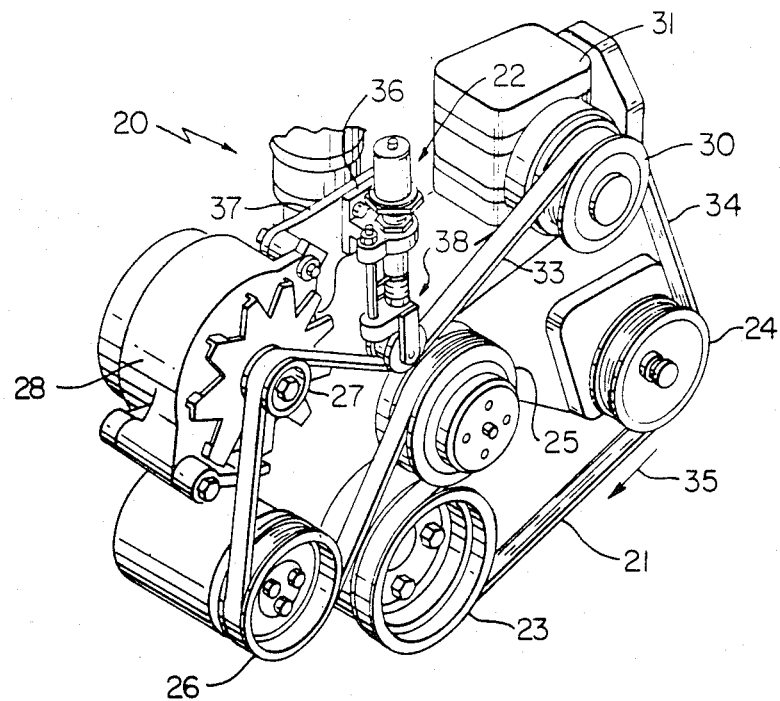
FIG. 1 is a fragmentary isometric view looking toward the front end of an automobile engine which utilizes one embodiment of the belt tensioner of this invention.

While the various features of this invention are hereinafter illustrated and described as providing a belt tensioner for a particular power transmission belt of a particular motor vehicle engine, it is to be understood that the various features of this invention can be utilized singly or in any combination thereof to provide a belt tensioner for other arrangements as desired.

Therefore, this invention is not to be limited to only the embodiment illustrated in the drawings, because the drawings are merely utilized to illustrate one of the wide varieties of uses of this invention.

Figure 2:
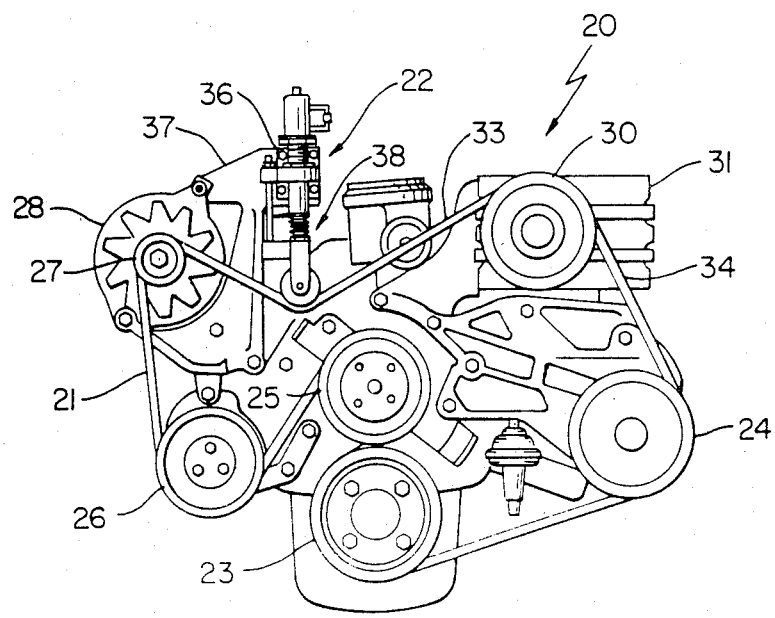
FIG. 2 is a view looking perpendicularly toward the front end of the automobile engine of FIG. 1.

Referring now to FIGS. 1 and 2, an automobile engine is generally indicated by the reference numeral 20 and utilizes an endless power transmission belt 21 for driving a plurality of driven accessories as hereinafter set forth, the improved belt tensioner of this invention being generally indicated by the reference numeral 22 and being utilized to provide a tensioning force on the belt 21 in a manner hereinafter set forth.

The endless power transmission belt 21 may be of any suitable type known in the art and is preferably made primarliy of a polymeric material because the unique features of the tensioner 22 of this invention readily permits the tensioner 21 to tension a belt having a polyester load-carrying cord in an efficient manner as hereinafter described.

The belt 21 is driven by a driving sheave 23 which is operatively interconnected to the crankshaft of the engine 20 in a manner well known in the art. The driving sheave 23 drives the belt 21 in an endless path and thereby drives a sheave 24 of a power steering device used in an automobile (not shown) utilizing the engine 20, a sheave 25 of an engine water pump, a sheave 26 of an air pump of a type used in an antipollution system for the engine 20, a sheave 27 of an engine electrical alternator 28, and a sheave 30 of a compressor 31 of an air conditioning system for the automobile utilizing the engine 20.

All of the driven accessories, through their sheaves 24, 25, 26, 27 and 30, impose a load on the belt 21. However, only the detailed description of the load being imposed by the compressor 31 and its sheave 30 on the belt 21 will be hereinafter described inasmuch as such load is generally of a comparatively high magnitude.

In particular, the compressor 31, upon being driven, creates a slack side 33 and a tight side 34 in the belt 21 upon turning on of the air conditioner system in the automobile, the slack side 33 and tight side 34 being produced since the belt is rotating clockwise as indicated by the arrow 35 in FIGS. 1 and 2.

The belt tight side 34 (and hence, slack side 33) varies in tightness, i.e., magnitude of tightness, in a cyclic manner and as a function of the inherent cyclic change in the loads imposed by the air compressor 31. This cyclic change and load varies between greater extremes in applications where the compressor 31 is of a piston type. The cyclic load imposed by the compressor 31 has a tendency to cause the slack side 33 of the belt 21 to vibrate or oscillate.

In addition to such vibrations and oscillations of the belt 21, it is known that normal belt wear and heat variations in the engine compartment for the engine 20 produces variations in the length of the belt 21 that require compensation for the same.

Thus, it is known that it is difficult to maintain such a belt 21 under tension with a force required to insure non-slipping engagement and driving of the driven sheaves whereby numerous belt tensioners have been proposed and used heretofore in an effort to provide the required tension.

It is believed that the improved belt tensioner 22 of this invention functions in a manner to provide a proper tensioning force on the belt 21 to overcome the aforementioned problems, namely, provides the required tension in the overall belt 21 as well as prevents any tendency of the belt to oscillate in an undesirable manner as a result of the cyclic load change imposed by the compressor 31 whereby the improved belt tensioner 22 of this invention will now be described.

Figure 3:
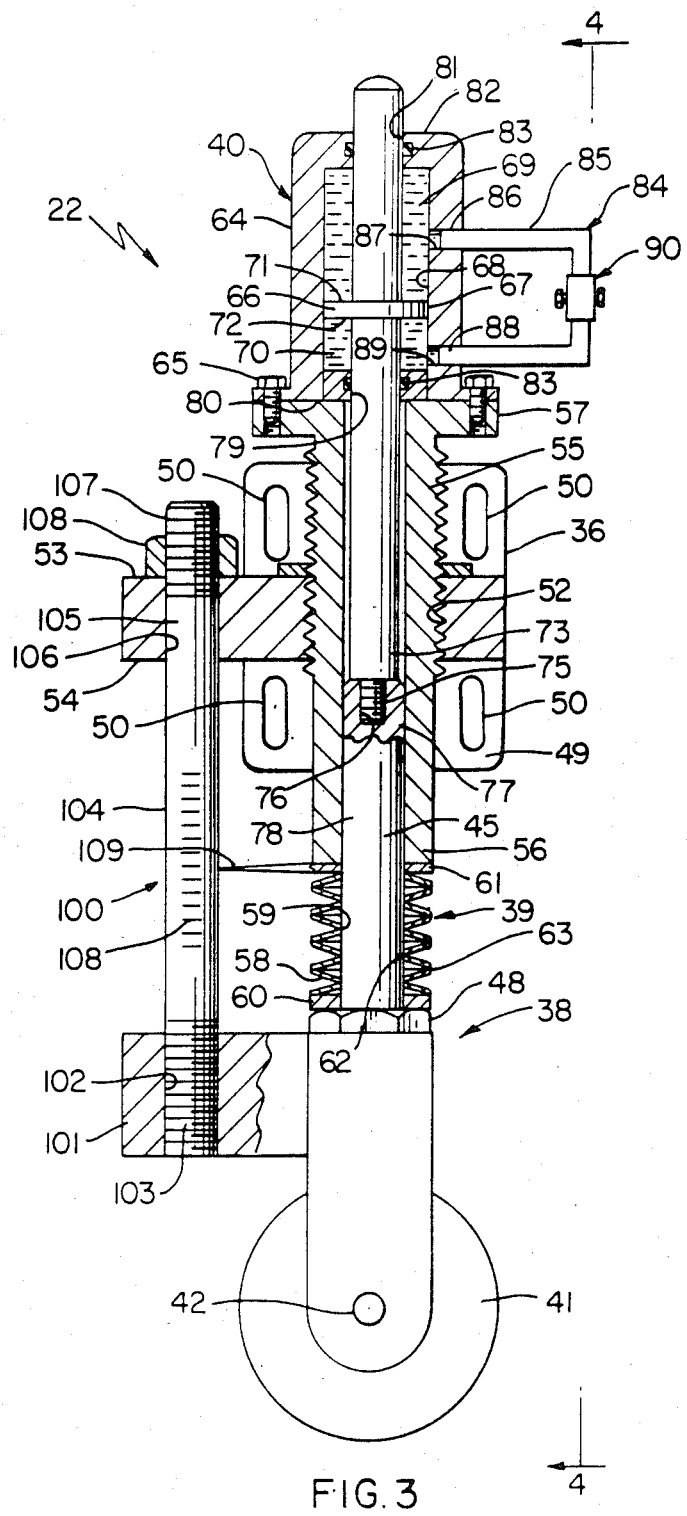
FIG. 3 is an enlarged front view, partially in cross section, of the belt tensioner of this invention that is being utilized for tensioning the power transmission belt of FIGS. 1 and 2.
Figure 4:
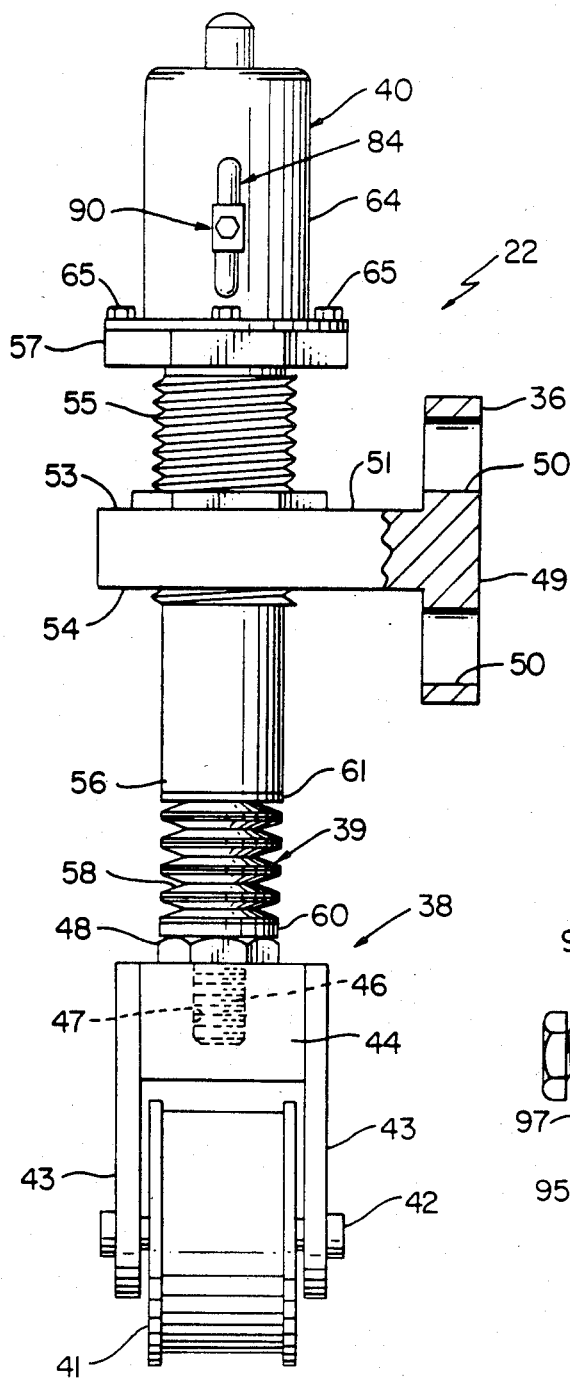
FIG. 4 is a side view of the belt tensioner of FIG. 3 and is taken in the direction of the arrows 4—4 of FIG. 3.

As best illustrated in FIGS. 3 and 4, the improved belt tensioner 22 of this invention comprises a support means 36 adapted to be fixed to a mounting bracket 37 of the engine 20 as illustrated in FIGS. 1 and 2. A belt engaging means that is generally indicated by the reference numeral 38 is movably carried by the support means 36 in a manner hereinafter set forth. The tensioner 22 has mechanical spring means that is generally indicated by the reference numeral 39 operatively associated with the support means 36 and belt engaging means 38 to tend to urge the belt engaging means 38 against the slack side 33 of the belt 21 in substantially a true vertically downwardly direction in a manner to substantially bisect the angle made by the belt 21 between the sheaves 27 and 30 as illustrated in FIG. 2.

The belt tensioner 22 also includes a fluid dampening means that is generally indicated by the reference numeral 40 and is operatively associated with the support means 36 and the belt engaging means 38 to dampen movement of the belt engaging means 38 relative to the support means 36 with a restricting force of the dampening means 40 in a manner hereinafter set forth.

The belt engaging means 38 includes an idler pulley 41 rotatably mounted by pivot pin means 42 to a pair of depending flanges 43 fastened to a block 44 that is threadedly interconnected to a rod or a shaft 45, the rod 45 having an externally threaded end 46 threadedly disposed in an internally threaded opening 47 in the block 44 and being secured therein by a lock nut means 48 in a manner well known in the art.

In this manner, the idler pulley 41 is rotatably mounted within the yoke arrangement provided by the flanges 43 and the block 44 to engage against the belt 21 as illustrated in FIGS. 1 and 2.

The support means 36 includes a substantially flat plate like member 49 having suitable elongated slots or openings 50 passing therethrough for adjustably mounting the support means 36 to any desired structure, such as the mounting bracket 37 of the engine 20 of FIGS. 1 and 2.

The support means 36 includes another plate like portion 51 extending transverse to the plate 49 and being secured thereto in any suitable manner, such as by being welded thereto or being integral and one-piece therewith as desired. The plate 51 has a threaded opening 52 passing through opposed sides 53 and 54 thereof and threadedly receives a tubular support member 55 of the support means 36 which is adapted to be axially adjustable in the threaded opening 52 to position the lower end 56 of the tubular support 55 at desired distances below the lower surface 54 of the support plate 51 for a purpose hereinafter described. For example, the tubular member 55 can have a hexagonally shaped upper portion 57 so that suitable wrenches and the like can be utilized to threadedly adjust the tubular member 55 in the support plate 51 before or after the support means 36 has been mounted to the mounting bracket 37 of the engine 20 to initially set the force of the spring means 39 on the belt 21 as will be apparent hereinafter.

The spring means 39 comprise a plurality of spring discs 58 that have central openings 59 passing therethrough and permitting the spring discs 58 to be disposed in a particular stacked relation on the rod 45 between a pair of flat washer-like members 60 and 61 respectively disposed against the lock nut means 48 and the end 56 of the tubular support member 55.

The spring discs 58 are of the type commonly sold and known as "belleville spring washers" and can be so selected and arranged that the same will provide a substantially constant urging force or even an increasing urging force as the idler pulley 41 is being moved toward the belt 21 to take up further slack therein under the spring force of the spring members 58 in a manner fully set forth and claimed in applicant's copending patent application, Ser. No. 296,694, filed Aug. 27, 1981 (Dayco Corporation Docket No. 81-6) whereby such copending patent application is being incorporated into this disclosure by this reference thereto for a further description of the structure and operation of the spring discs 58 whereby a further discussion thereof in this application is deemed unnecessary except to state that the spring discs 58 when compressed between their inner periphery 62 and outer periphery 63 deflect in such a manner that the same store spring energy to tend to expand the same and thereby urge the pulley 41 away from the support means 36 toward the belt 21 as will be apparent hereinafter.

Of course, it is to be understood that other types of mechanical spring means could be utilized in the tensioner 22 of this invention, if desired, whereby this invention is not to be limited to the particular spring members 58 illustrated and described.

The fluid dampening means 40 of this invention comprises a cylinder member 64 adapted to be secured to the upper hexagonal portion 57 of the tubular support member 55 in any suitable manner, such as by fastening means 65 as illustrated in FIGS. 3 and 4.

A piston member 66 is disposed in the cylinder member 64 and has an outer peripheral portion 67 adapted to be disposed closely adjacent the internal peripheral surface 68 of the cylinder member 64 to define opposed chambers 69 and 70 on opposite sides 71 and 72 thereof while being movable in the cylinder member 64 in a manner well known in the art, the piston member 66 being secured in any suitable manner to the rod 45 which includes an upper extension 73 that has a lower externally threaded end 75 threadedly received in an internally threaded bore 76 in the upper end 77 of a lower portion 78 of the rod 45 as illustrated.

In this manner, movement of the idler pulley 41 relative to the support means 36 causes like movement of the piston member 66 in the cylinder member 64 so as to change the volumes of the chambers 69 and 70 for a fluid dampening purpose hereinafter described.

The rod extension 73 extends through an opening 79 in the lower end 80 of the cylinder member 64 as well as out of an opening 81 in the upper end 82 of the cylinder member 64, suitable sealing means 83 being carried by the ends 80 and 82 of cylinder member 64 to seal with the rod extension 73 and thereby seal the chambers 69 and 70 from the respective openings 81 and 79 of the ends 82 and 80 of the cylinder member 64.

A passage defining means that is generally indicated by the reference numeral 84 in FIGS. 3 and 4 is utilized to fluidly interconnect the chambers 69 and 70 of the cylinder member 64 and thereby provide a closed fluid loop arrangement, the passage defining means 84 comprising a conduit means 85 having one end 86 secured in an opening 87 in the cylinder member 64 that leads to the top of the chamber 69 while the other end 88 of the conduit means 85 is secured in an opening 89 formed in the cylinder member 64 and being disposed in communication with the bottom of the chamber 70 as illustrated.

The passage defining means 84 has a flow control valve means therein that is generally indicated by the reference numeral 90 in FIGS. 3 and 4 and in the preferred embodiment of this invention is adapted to provide a greater restricting flow of fluid from the chamber 69 to the chamber 70 through the passage defining means 84 than the restricting force of fluid flow from the chamber 70 to the chamber 69 as will be apparent hereinafter.

While the flow control means 90 can be of any conventional form well known in the art, one typical flow control valve means 90 that can be utilized is generally indicated by the reference numeral 91 in FIG. 5 and will later be described.

However, it is to be understood that the flow control means 90 can be a fixed flow control means, an adjustable flow control means and even be adapted to close the passage defining means 84 to substantially lock the idler pulley 41 in a set position relative to the support means 36 as will be apparent hereinafter.

In any event, the dampening means 40 is filled with any suitable fluid in such a manner that both chambers 69 and 70 of the cylinder member 84 are substantially filled with such fluid as well as the entire passage defining means, it presently being preferred that the fluid comprises a liquid, such as a hydraulic oil or the like.

If desired, a spring deflection load calibration indicator means that is generally indicated by the reference numeral 100 in FIGS. 3 and 4 can be utilized to initially set the amount of deflection or compression of the spring members 58 so that the same will initially provide a certain spring force against the belt 21 when the tensioner 22 is initially mounted to the bracket 37 of the engine 20, such indicator means 100 forming part of the invention of the aforementioned copending patent application which has already been incorporated into this disclosure by the previous reference thereto whereby only sufficient details of the indicator 100 necessary to understand the operation of this invention will now be described.

The pulley block 44 has an extension 101 provided with a threaded bore 102 threadedly receiving an externally threaded end 103 of a rod 104 that has its upper end 105 loosely passing through an opening 106 in the support plate 51, the rod 104 having an upper externally threaded end 107 receiving a nut 108 for engaging against the upper surface 53 of the plate 51 as illustrated when the springs 58 are disposed in their fully expanded condition.

The rod 104 is provided with suitable indicator marks 108 thereon that are adapted to cooperate with an indicator pointer 109 carried by the tubular support member 55 whereby the position of the marks 108 on the rod 104 relative to the indicator 109 provides a visual measurement of the amount of deflection or compression of the spring members 58 between the support means 36 and the belt engaging means 38 and, thus, the amount of initial load being imposed on the belt 21.

In particular, when the support means 36 is in a fixed position against the bracket 37 and the pulley 41 is disposed against the belt 21, rotation of the tubular support member 55 in a direction to cause the end 56 thereof to move toward the pulley 41 causes the spring discs 58 to be compressed between the end 56 of the tubular member 55 and the pulley block 44 and such movement of the end 56 of the tubular support 55 moves the indicator 109 downwardly relative to the marks 108 on the indicating rod 104 so that when the desired deflection is reached, rotation of the support member 55 is terminated. In this manner, the indicator means 108, 109, will provide the assurance that a proper deflection of the spring members 58 is taking place when the idler pulley 41 is initially installed and engaging against the belt 21.

Therefore, it can be seen that it is a relatively simple method of this invention to make the improved belt tensioner 22 of this invention that is adapted to operate in a manner now to be described.

When the tensioner 22 of this invention has been mounted by its support plate 49 to the bracket 37 of the engine 20 so that the idler pulley 41 thereof is engaging against the belt 21 under the urging force of the spring members 58, the installer can adjust the tubular support member 55 upwardly or downwardly relative to the plate 51 so that the spring means 58 will be under a certain initial deflection as determined by the position of the proper marks 108 on the rod 104 relative to the indicator 109 in the manner previously set forth whereby the tensioner 22 of this invention will be providing a predetermined force against the belt 21 in the at rest position of the engine 20. In addition, the flow control valve 90 has been either factory adjusted or installer adjusted to set the desired differential flow characteristics between the chambers 69 and 70 of the dampening means 40.

Thereafter, each time the engine 20 is initially started so as to cause slack in the slack side 33 of the belt 21 and a tightening in the tight side 34 thereof, the force of the spring means 58 causes the idler pulley 41 to move inwardly to take up the slack of the belt 21 on the slack side 33 thereof and provide a tensioning force thereon as determined by the force of the spring members 58, such inward movement of the pulley 41 causing the piston member 66 to move downwardly in FIG. 3 and displace fluid in the chamber 70 through the passage defining means 84 and the flow control valve means 90 to the chamber 69 in a manner to dampen such downward movement of the pulley 41.

Thus, it can be seen that as the belt 21 is traveling in the direction of the arrow 35 in FIGS. 1 and 2 by the running engine 20, any vibrations and oscillations of the belt 21, such as caused by the turning on and off of the air conditioning compressor 31 as previously set forth, will cause an up and down oscillation of the portion 33 of the belt 21 which movement is imposed on the pulley 41 of the tensioner 22.

In those instances where the deflection of the portion 33 of the belt 21 is upwardly in FIGS. 1 and 2 to tend to cause the pulley 41 to move upwardly relative to the support means 36, such movement causes the piston member 66 to move upwardly and thereby force the fluid from the chamber 69 through the passage defining means 84 and flow control valve 90 to the chamber 70 and since the flow control valve means 90 is set to restrict such flow at a greater rate than in the reverse direction of fluid flow through the passage defining means 84, such upward movement of the pulley 41 relative to the support means 36 is at a slower rate than when the pulley 41 is being moved downwardly away from the support means 36, the flow control means 90 being such that even the downward movement of the pulley 41 away from the support means 36 is dampened to a desired degree.

In this manner, it is believed that the dampening means 40 of this invention will prolong the life of the tensioner 22 so that rapid oscillations of the spring means 58 thereof cannot take place and the spring means 58 will perform their tensioning function in a relatively smooth manner.

In particular, since the flow control means 90 provides preferential flow ratio that can be controlled, the tensioner 22 will deliver increased tension on the belt 21 when the belt 21 is subjected to acceleration and/or heavy cyclic loads commonly encountered in belt drive systems. Accordingly, if the fluid flow from chamber 69 to chamber 70 is more restrictive than reverse flow, load fluctuations in the belt system will result in an increased pressure on the top side 71 of the piston 66 which will force the idler pulley 41 down into the belt 21 and result in greater belt tension. In this manner, the tensioner 22 will deliver greater tension when the system demands and less tension when less tension is required. This can result in increased bearing life in belt driven accessories, reduced belt slippage under heavy loading conditions, and an increased effective life of the tensioner 22 itself.

Figure 5:
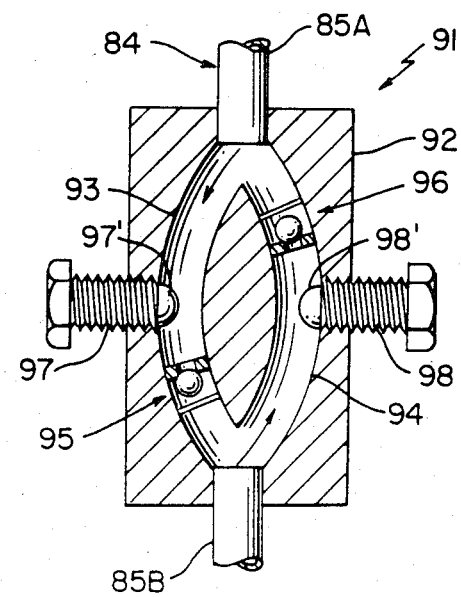
FIG. 5 is a fragmentary cross-sectional view illustrating a typical flow control valve that can be utilized with the belt tensioner of this invention that is illustrated in FIG. 3.

The flow control valve 91 schematically illustrated in FIG. 5 comprises a housing means 92 provided with two branch passages 93 and 94 passing therethrough and which are joined together at their respective ends so as to be joined to the respective parts 85A and 85B of the conduit means 85 of the passage defining means 84, the branch passage 93 having a one-way check valve means 95 therein and the passage 94 having a one-way check valve 96 therein whereby the flow of fluid from the upper conduit part 85A to the lower conduit part 85B can only take place through the branch passage 93 because of the one-way check valve means 95 thereof and the fluid flow from the lower conduit part 85B to the upper conduit part 85A can only take place through the branch passage 94 because of the one-way check valve 96. The check valves 95 and 96 comprise conventional ball and seat check valves and are well known in the art.

A pair of threaded adjusting flow control valve members 97 and 98 are threadedly carried by the housing means 92 and respectively have ends 97' and 98' that control the amount of fluid flow through the respective branch passages 93 and 94 depending upon the threaded relationship of the respective adjusting members 97 and 98 relative to the housing means 92, such flow control means 97 and 98 being well known in the art.

In this manner, by setting the adjusting members 97 and 98 in the desired flow controlling relation, the rate of fluid flow through the passage 93 can be set to be more restrictive than the rate of fluid flow through the passage 94 set by the adjusting member 98 for the reasons previously set forth and, if desired, the tensioner 22 can be substantially locked in a set position thereof by utilizing the adjusting members 97 and 98 to completely close off the passages 93 and 94 so that there can be no fluid flow through the passage defining means 84 from the chambers 69 and 70 of the cylinder member 64.

Of course, it is to be understood that the flow control device 91 illustrated in FIG. 5 is merely for illustrative purposes and other flow control devices can be utilized whether the flow rates thereof are adjustable, fixed, or comprise two separate devices or a single device, as desired.

Also, while the spring means 39 has been illustrated and described as being remote from the dampening means 40 of the tensioner 22, it is to be understood that the spring washers 58 could be disposed in either chamber 69 or 70 or in both chambers 69 and 70, if desired.

Therefore, it can be seen that this invention not only provides an improved belt tensioner, but also this invention provides an improved method of making such a belt tensioner.

While the form and method of this invention now preferred have been illustrated and described as required by the Patent Statute, it is to be understood that other forms and method steps can be utilized and still fall within the scope of the appended claims.

What is claimed is:

1. In a tensioner for a power transmission belt that is adapted to be operated in an endless path, said tensioner comprising a support means for being fixed relative to said belt, a belt engaging means carried by said support means and being movable relative thereto, mechanical spring means operatively associated with said support means and said belt engaging means for urging said belt engaging means relative to said support means and against said belt with a force to tension said belt, and dampening means to dampen the movement of said belt engaging means relative to said support means with a restricting force of said dampening means, said dampening means comprising fluid dampening means operatively associated with said support means and said belt engaging means to dampen the movement of said belt engaging means relative to said support means in at least one direction of movement thereof, the improvement wherein said dampening means comprises a closed fluid loop arrangement that has means that dampens the movement of said belt engaging means with a greater said restricting force when said belt engaging means is being moved in one direction relative to said support means than said restricting force of said dampening means when said belt engaging means is being moved in the opposite direction relative to said support means.

2. A tensioner as set forth in claim 1 wherein said dampening means has means for adjusting said restricting force thereof in at least one direction of movement of said belt engaging means relative to said support means.

3. A tensioner as set forth in claim 1 wherein said dampening means has means for adjusting said restricting force thereof.

4. A tensioner as set forth in claim 1 wherein said dampening means has means for locking said belt engaging means in a fixed position relative to said support means.

5. A tensioner as set forth in claim 1 wherein said dampening means comprises a cylinder, a movable piston disposed in said cylinder and being interconnected to said belt engaging means to move in unison therewith, said piston having opposed surfaces respectively cooperating with said cylinder to define opposed chambers therein, passage defining means interconnecting said opposed chambers together whereby said passage defining means and said opposed chambers provide said closed fluid loop arrangement, and a liquid disposed in said opposed chambers and said passage defining means and substantially filling the same to dampen movement of said piston in said cylinder and, thus, to dampen movement of said belt engaging means relative to said support means.

6. A tensioner as set forth in claim 5 wherein said dampening means comprises a flow control means controlling the flow of said liquid through said passage defining means.

7. A tensioner as set forth in claim 6 wherein said flow control means is adjustable to change the flow rate through said passage defining means in at least one direction between said opposed chambers.

8. A tensioner as set forth in claim 5 wherein said piston has a rod means interconnected thereto, said rod means being interconnected to said belt engaging means to interconnect said piston to said belt engaging means, said belt engaging means comprising an idler pulley.

9. In a method of making a tensioner for a power transmission belt that is adapted to be operated in an endless path, said method comprising the steps of providing a support means for being fixed relative to said belt, providing a belt engaging means to be carried by said support means and be movable relative thereto, operatively associating mechanical spring means with said support means and said belt engaging means for urging said belt engaging means relative to said support means and against said belt with a force to tension said belt, and providing dampening means to dampen the movement of said belt engaging means relative to said support means with a restricting force of said dampening means, said step of providing said dampening means comprising the steps of forming said dampening means to comprise fluid dampening means, and operatively associating said fluid dampening means with said support means and said belt engaging means to dampen the movement of said belt engaging means relative to said support means in at least one direction of movement thereof, the improvement comprising the step of forming said dampening means to comprise a closed fluid loop arrangement that has means to dampen the movement of said belt engaging means with a greater said restricting force when said belt engaging means is being moved in one direction relative to said support means than said restricting force of said dampening means when said belt engaging means is being moved in the opposite direction relative to said support means.

10. A method as set forth in claim 9 and including the step of forming said dampening means with means for adjusting said restricting force thereof in at least one direction of movement of said belt engaging means relative to said support means.

11. A method as set forth in claim 9 and including the step of forming said dampening means with means for adjusting said restricting force thereof.

12. A method as set forth in claim 9 and including the step of forming said dampening means with means for locking said belt engaging means in a fixed position relative to said support means.

13. A method as set forth in claim 9 and including the steps of forming said dampening means to comprise a cylinder with a movable piston disposed in said cylinder, interconnecting said piston to said belt engaging means to move in unison therewith, causing said piston to have opposed surfaces thereof respectively cooperating with said cylinder to define opposed chambers therein, interconnecting said opposed chambers together with passage defining means whereby said passage defining means and said opposed chambers comprise said closed fluid loop arrangement, and disposing a liquid in said opposed chambers and said passage defining means to substantially fill the same to dampen movement of said piston in said cylinder and, thus, to dampen movement of said belt engaging means relative to said support means.

14. A method as set forth in claim 12 and including the step of forming said dampening means with a flow control means for controlling the flow of said liquid through said passage defining means.

15. A method as set forth in claim 13 and including the step of forming said flow control means to be adjustable to change the flow rate through said passage defining means in at least one direction between said opposed chambers.

16. A method as set forth in claim 12 and including the steps of interconnecting a rod means to said piston, interconnecting said rod means to said belt engaging means to interconnect said piston to said belt engaging means, and forming said belt engaging means to comprise an idler pulley.

* * * * *